US008630938B2

(12) United States Patent  
Cheng et al.

(10) Patent No.: US 8,630,938 B2  
(45) Date of Patent: Jan. 14, 2014

(54) METHOD AND APPARATUS TO DETECT FRAUDULENT ACTIVITIES WITHIN A NETWORK-BASED AUCTION FACILITY

(75) Inventors: Christine Cheng, Sunnyvale, CA (US); Brenda Won, Sunnyvale, CA (US); Dheeraj Mohnia, Sunnyvale, CA (US); Ha Nguyen, Sunnyvale, CA (US); Reed Maltzman, San Francisco, CA (US); Isaac Strack, Saratoga Springs, UT (US); Noel Morin, Boulder Creek, CA (US)

(73) Assignee: eBay Inc., San Jose, CA (US)

( * ) Notice: Subject to any disclaimer, the term of this patent is extended or adjusted under 35 U.S.C. 154(b) by 2513 days.

(21) Appl. No.: 09/905,046

(22) Filed: Jul. 12, 2001

(65) Prior Publication Data

US 2002/0059130 A1 May 16, 2002

Related U.S. Application Data

(60) Provisional application No. 60/249,139, filed on Nov. 15, 2000.

(51) Int. Cl.  
*G06Q 40/00* (2012.01)

(52) U.S. Cl.  
USPC ............................................. 705/37; 705/35

(58) Field of Classification Search  
USPC .............. 395/186, 185.01, 575, 24; 371/67.1; 705/26, 40, 27, 28, 29, 11, 37  
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymayer |
| 3,687,256 | A | 8/1972 | Jones |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |

(Continued)

FOREIGN PATENT DOCUMENTS

| | | |
|---|---|---|
| CA | 2253543 | 3/1997 |
| FR | 2658635 A1 | 2/1991 |

(Continued)

OTHER PUBLICATIONS

Michael Miller, The complete Idiot's Guide to Ebay Online Auctions, copyright Jul. 1999.*

(Continued)

*Primary Examiner* — Ojo O Oyebisi  
(74) *Attorney, Agent, or Firm* — Schwegman Lundberg & Woessner, P.A.

(57) ABSTRACT

Methods and apparatuses for detecting fraudulent activities made over a network-based transaction facility using a machine. In responsive to a first event with respect to the network-based transaction facility and initiated under a first user identity from the machine which is coupled to the network-based transaction facility via a network, the method causes a first identifier associated with the first user identity to be stored on the machine. In responsive to a second event with respect to the network-based transaction facility and initiated under a second user identity from the machine, the method causes a detecting of a potentially fraudulent activity by detecting a lack of correspondence between the first identifier stored on the machine and a second identifier associated with the second user identity.

26 Claims, 11 Drawing Sheets

(56) References Cited

U.S. PATENT DOCUMENTS

| | | | |
|---|---|---|---|
| 4,799,156 | A | 1/1989 | Shavit et al. |
| 4,823,265 | A | 4/1989 | Nelson |
| 4,903,201 | A | 2/1990 | Wagner |
| 4,992,940 | A | 2/1991 | Dworkin |
| 5,063,507 | A | 11/1991 | Lindsey et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |
| 5,280,305 | A | 1/1994 | Monroe |
| 5,280,422 | A | 1/1994 | Moe et al. |
| 5,283,731 | A | 2/1994 | Lalonde et al. |
| 5,285,383 | A | 2/1994 | Lindsey et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,325,297 | A | 6/1994 | Bird et al. |
| 5,329,589 | A | 7/1994 | Fraser et al. |
| 5,335,170 | A | 8/1994 | Petteruti et al. |
| 5,345,091 | A | 9/1994 | Craig et al. |
| 5,375,055 | A | 12/1994 | Togher et al. |
| 5,383,113 | A | 1/1995 | Kight et al. |
| 5,394,324 | A | 2/1995 | Clearwater |
| 5,402,336 | A | 3/1995 | Spiegelhoff et al. |
| 5,424,944 | A | 6/1995 | Kelly et al. |
| 5,426,281 | A | 6/1995 | Abecassis |
| 5,453,926 | A | 9/1995 | Stroschin et al. |
| 5,521,815 | A | 5/1996 | Rose, Jr. |
| 5,526,479 | A | 6/1996 | Barstow et al. |
| 5,553,145 | A | 9/1996 | Micali |
| 5,557,742 | A * | 9/1996 | Smaha et al. .................. 726/22 |
| 5,592,375 | A | 1/1997 | Salmon et al. |
| 5,640,569 | A | 6/1997 | Miller et al. |
| 5,664,111 | A | 9/1997 | Nahan et al. |
| 5,664,115 | A | 9/1997 | Fraser |
| 5,675,784 | A | 10/1997 | Maxwell et al. |
| 5,689,652 | A | 11/1997 | Lupien et al. |
| 5,708,780 | A | 1/1998 | Levergood et al. |
| 5,710,889 | A | 1/1998 | Clark et al. |
| 5,715,314 | A | 2/1998 | Payne et al. |
| 5,715,402 | A | 2/1998 | Popolo |
| 5,717,989 | A | 2/1998 | Tozzoli et al. |
| 5,727,165 | A | 3/1998 | Ordish et al. |
| 5,790,790 | A | 8/1998 | Smith et al. |
| 5,794,207 | A | 8/1998 | Walker et al. |
| 5,794,219 | A | 8/1998 | Brown |
| 5,818,914 | A | 10/1998 | Fujisaki |
| 5,826,241 | A | 10/1998 | Stein et al. |
| 5,826,244 | A | 10/1998 | Huberman |
| 5,835,896 | A | 11/1998 | Fisher et al. |
| 5,845,265 | A | 12/1998 | Woolston |
| 5,845,266 | A | 12/1998 | Lupien et al. |
| 5,850,442 | A | 12/1998 | Muftic |
| 5,913,040 | A | 6/1999 | Rakavy et al. |
| 5,919,257 | A * | 7/1999 | Trostle ........................... 726/22 |
| 6,047,264 | A | 4/2000 | Fisher et al. |
| 6,049,785 | A | 4/2000 | Gifford |
| 6,061,448 | A | 5/2000 | Smith et al. |
| 6,085,176 | A | 7/2000 | Woolston et al. |
| 6,119,137 | A | 9/2000 | Smith et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher et al. |
| 7,954,144 | B1 * | 5/2011 | Ebrahimi et al. ............... 726/12 |

FOREIGN PATENT DOCUMENTS

| | | |
|---|---|---|
| NL | 9300266 | 2/1993 |
| WO | WO 92/15174 | 2/1992 |
| WO | WO 96/34356 | 4/1996 |
| WO | WO 97/37315 | 3/1997 |

OTHER PUBLICATIONS

Alex G. Buchner and Maurice D. Mulvenna, Discovering Internet marketing intelligence through online analytical web usage mining, ACM SIGMOD Record archive, vol. 27, Issue 4 (Dec. 1998), pp. 54-61, Year of Publication: 1998, ISSN:0163-5808.*

Malone, TW; Yates, J; et al., "Electronic Markets and Electronic Hierarchies", *Communications—of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technical Disclosure Bulletin*, Jan. 1995, pp. 83-84, vol. 38, No. 1, USA.

Neo, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Research—Elecapnic Networking Applications and Policy*, Jan. 1, 1995, vol. 5, No. 4, pp. 10-16.

Massimb, MN; Phelps, BD, "Electronic Trading, Market Structure and Liquidity", *Financial Analysts Journal*, Jan.-Feb. 1994, vol. 50, No. 1, pp. 39-50, Charlottesville, Virginia.

Post, DL; Coppinger, SS, et al., "Application of Auctions as a Pricing Mechanism for the Interchange of Electric Power", *IEEE Transactions on Power Systems*, Aug. 1995, pp. 7, vol. 10.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21, Elsevier Science Publishing Co., Inc. New York, Ny.

"Anonymous Delivery of Goods in Electronic Commerce", *IBM Technical Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken,"Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electronic Markets*, Oct. 1993, No. 9/10.

Tjostheim, I; Eide, J., "A case study of an on-line auction for the World Wide Web", *Norwegian Computing Center*, No Date Given, pp. 1-10.

Graham, I., "The Emergence of Linked Fish Markets in Europe", *Focus Theme*, No Date Given, pp. 1-4.

(56) References Cited

OTHER PUBLICATIONS

Reck, Martin., "Trading-Process Characteristics of Electronic Auctions", *Focus Theme*, No Date Given, pp. 1-7.
Van Heck, E; Ribbers, PM., "Experiences with Electronic Auctions in the Dutch Flower Industry", *Focus Theme*, No Date Given, pp. 1-6.
Lee, HG., "Aucnet: Electronic Intermediary for Used-Car Transactions", *Focus Theme*, No Date Given, pp. 1-5.
Klein, S., "Introduction to Electronic Auctions", *Focus Theme*, No Date Given, pp. 1-4.
Turban, E. "Auctions and Bidding on the Internet an Assessment", *Focus Theme*, No Date Given, pp. 1-5.
Zwass, Vladimir., "Electronic Commerce: Structures and Issues", *International Journal of Electronic Commerce*, Fall 1996, pp. 3-23, vol. 1, No. 1.

* cited by examiner

| USER TABLE | | | | | |
|---|---|---|---|---|---|
| USER ID | NAME | ADDRESS | PHONE # | VERIFICATION DETAIL | VERIFICATION RATING |
| 62 | 64 | 66 | 68 | 70 | 72 |

| LOCATIONS TABLE | | | | | | | | | | | | |
|---|---|---|---|---|---|---|---|---|---|---|---|---|
| ZIP CODE | CITY | STATE | COUNTY NAME | COUNTY CODE | COUNTRY | AREA CODE | TIME ZONE | DAYLIGHT SAVINGS TIME FLAG | LATITUDE | LONGITUDE | CITY FLAG | SOURCE |
| 80 | 82 | 84 | 86 | 88 | 90 | 92 | 94 | 96 | 98 | 100 | 102 | 104 |

FIG. 4

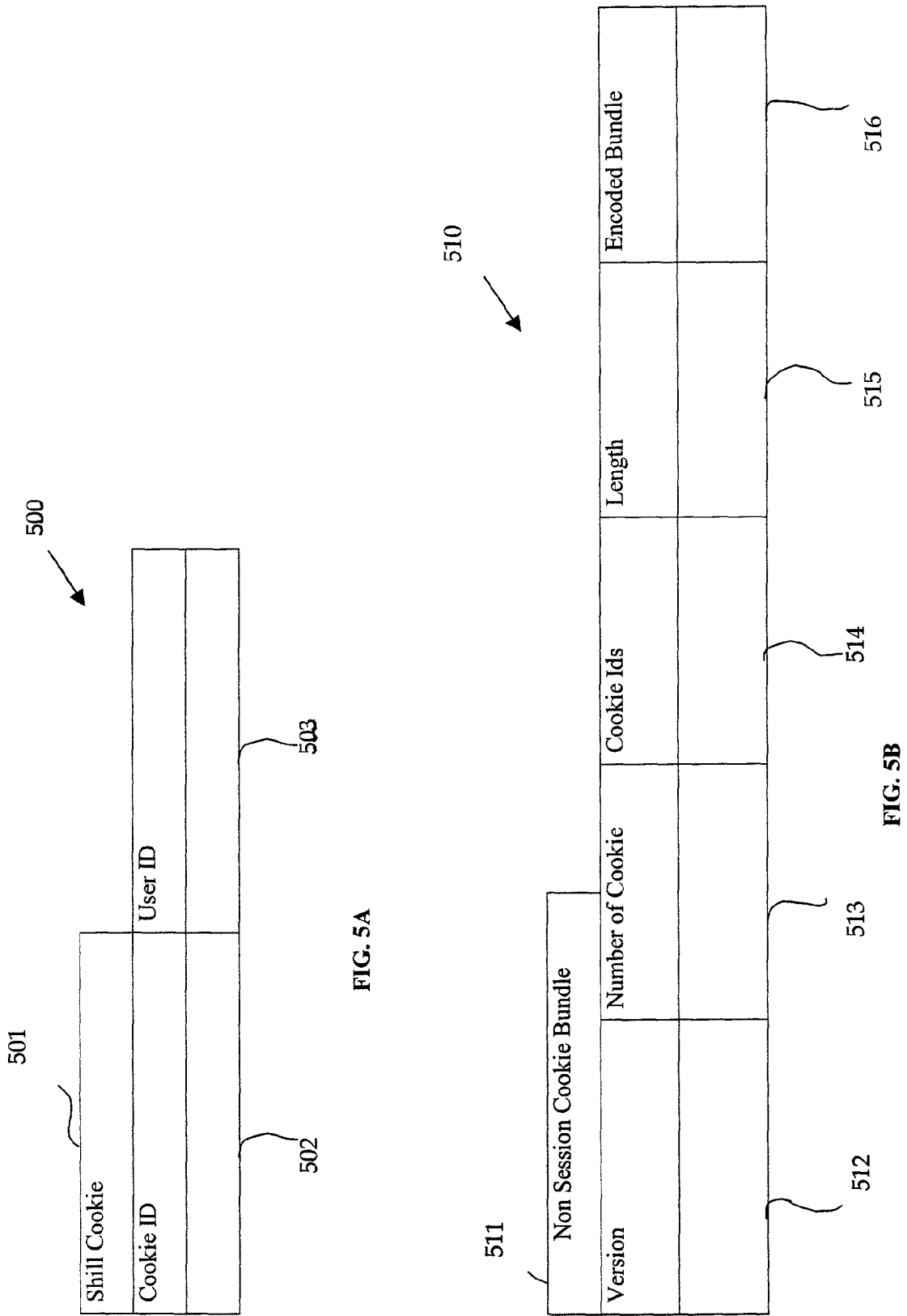

METHOD AND APPARATUS TO DETECT FRAUDULENT ACTIVITIES WITHIN A NETWORK-BASED AUCTION FACILITY

This application is based on U.S. Provisional patent application No. 60/249,139 filed on Nov. 15, 2000 entitled "Method and System to Deter Shill Bidding Activity Within a Network-Based Auction Facility."

FIELD OF THE INVENTION

The present invention relates generally to the field of e-commerce and, more specifically, to detecting, minimizing, and deterring suspicious transactions occurring within a network-based transaction facility such as, for example, an Internet-based auction facility.

BACKGROUND OF THE INVENTION

Some of the advantages offered by a typical network-based transaction facility, such as an Internet-based auction facility, are the simplicity, promptness and convenience of participating in the auction process. Conducting transaction such as auctioning over a network-based transaction facility has becoming very popular. Increasing traffic to the facility also increases the occurrence of fraudulent transactions, for example, fraudulent bidding and fraudulent providing of feedback by the same entity or its associates. Fraudulent transactions continue to plague many online auction facilities with negative press, associated backlash and possible decrease in overall transitioning levels.

SUMMARY OF THE INVENTION

The present invention discloses methods and apparatuses for detecting fraudulent activities made over a network-based transaction facility using a machine. In responsive to a first event with respect to the network-based transaction facility and initiated under a first user identity from the machine which is coupled to the network-based transaction facility via a network, the method causes a first identifier associated with the first user identity to be stored on the machine. In responsive to a second event with respect to the network-based transaction facility and initiated under a second user identity from the machine, the method causes detecting of a potentially fraudulent activity by detecting a lack of correspondence between the first identifier stored on the machine and a second identifier associated with the second user identity.

BRIEF DESCRIPTION OF THE DRAWINGS

The present invention is illustrated by way of example and not limitation in the figures of the accompanying drawings, in which like references indicate similar elements and in which:

FIG. 3 illustrates an exemplary diagrammatic representation of one embodiment of a user table within the database;

FIG. 4 illustrates an exemplary diagrammatic representation of one embodiment of a locations table within the database;

FIG. 5A illustrates an exemplary format of shill cookie that is placed on a client machine and that is feeding to the network-based transaction facility;

FIG. 5B illustrates an exemplary format of a non-session cookie bundle that is placed on a client machine and that is feeding to the network-based transaction facility;

DETAILED DESCRIPTION

Methods and apparatuses for detecting suspicious transactions or fraudulent activities occurring over a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions, providing feedback, accessing e-mail, and the like.

Transaction Facility

Figure 1:
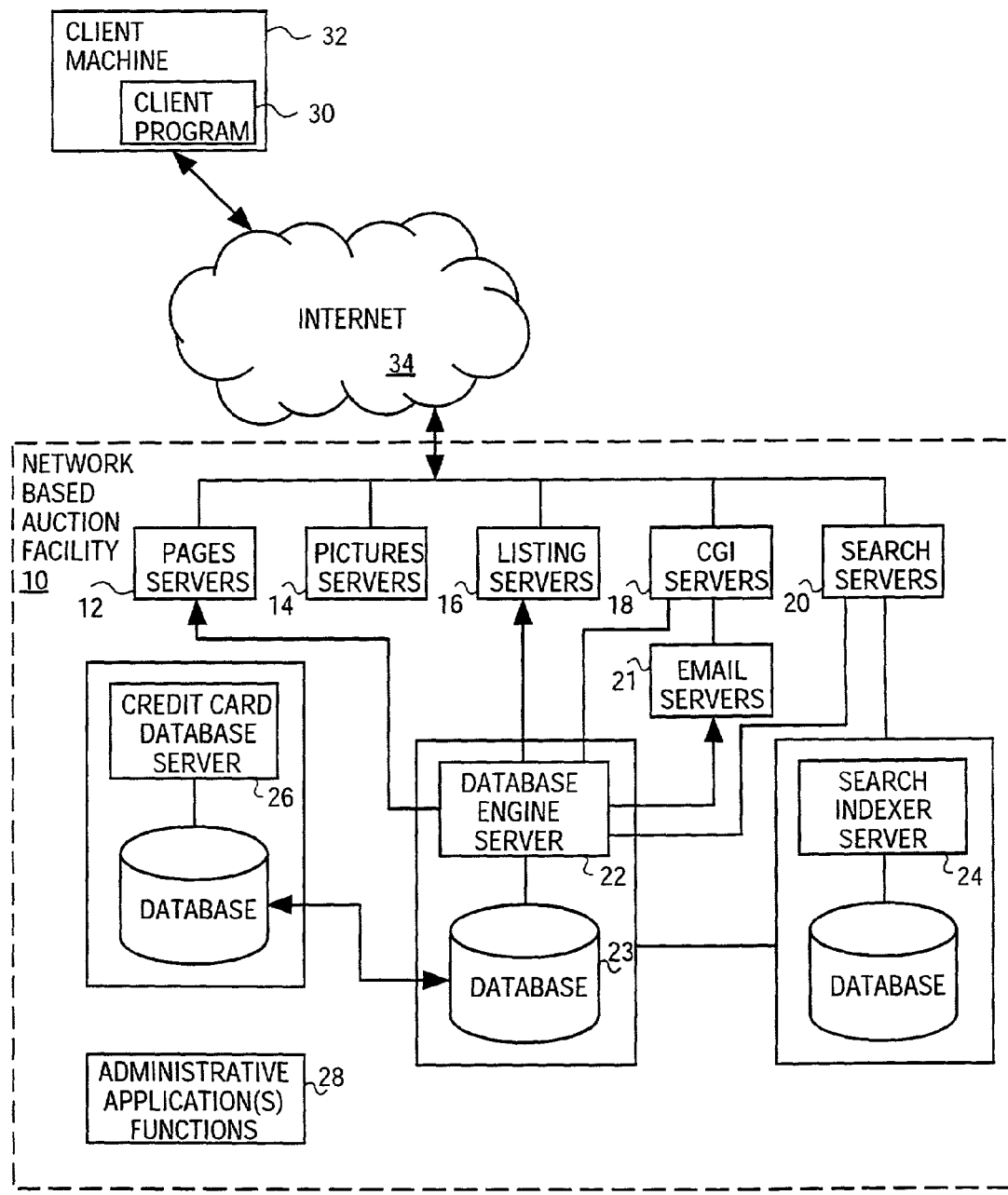
FIG. 1 is an exemplary block diagram of one embodiment of a network-based transaction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database, for example, database 23.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
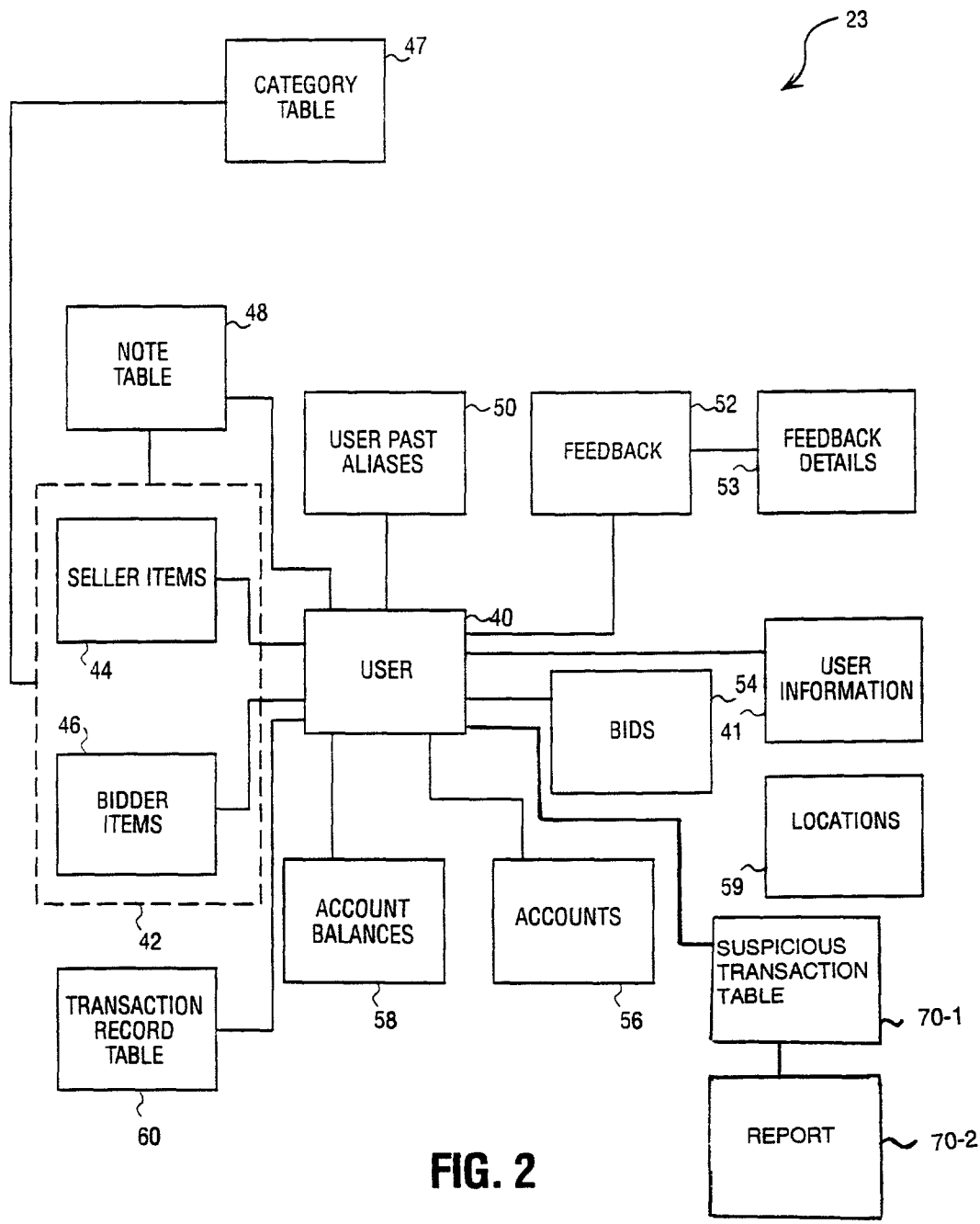
FIG. 2 illustrates an exemplary block diagram of one embodiment of a database maintained by a database engine server.

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an objectoriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60. In addition, the database 23 includes a location table 59 which stores valid demographic information that is used to verify registration information submitted by users during the registration process. Further yet, database 23 includes a potentially fraudulent activity table or a suspicious transaction table 70-1 and report table 70-2 used to record and report potentially fraudulent activities or suspicious transactions occurring from client machines.

FIG. 3 is a diagrammatic representation of an exemplary embodiment of the user table 40 that is populated with records, or entries, for each user of the auction facility 10. The table 40 includes a user identifier column 62 that stores a unique identifier for each user. A name column 64 stores a first name, a middle initial and a last name for each user. An address column 66 stores full address information for each user, e.g. a street name and number, city, zip code, state, etc. A phone number column 68 stores a home phone number for each user. It may be desirable to have each user verified, for example, through some identity checking process to verify that the user is who it is purporting to be prior to granting access to a particular user. Verification detail column 70 and verification rating column 72 may be included in the user table 40 to indicate details and rating of each individual's verification process.

It will be appreciated that any information other than that described above may populate the user table 40 without loss of generality.

FIG. 4 is an exemplary diagrammatic representation of an embodiment of the location table 59. The location table 59 stores a list of current zip codes and associated location information. In one embodiment, the data stored in the location table 59 is imported from a commercial database and is periodically completely re-populated with a new release of the commercial database. Alternatively, the data stored in the locations table 59 is obtained from various sources including various commercial databases and/or the auction facility 10 itself. The table 59 includes a zip code column 80 that stores a list of current zip codes in the U.S. and abroad. Each zip code corresponds to a valid city information stored in a city column 82. A flag stored in a column 102 indicates whether the city information stored in the column 82 is for a main city or an alias city. The zip code information stored in the column 80 is also correlated with areas code information stored in an area code column 92 and with other location information stored in a state column 84, country name column 86, country code column 88, country column 90, time zone column 94, latitude column 98, and longitude column 100. A column 96 includes a flag indicating, for each entry, whether daylight savings time is adopted in this geographic area. A source column 104 stores a value indicating the source of the record, i.e., whether the record was imported from a certain commercial database, created by an administrator of the auction facility 10, or was originated by other source.

It will be appreciated that other demographic information may also populate the location table 59.

Shill Bidding

Shill bidding is defined as fraudulent bidding by the seller (using an alternate registration) or by an associate of the seller in order to inflate the price of an offering (e.g., an item or a service). One form of shill bidding is when a seller uses multiple user identifiers or user identifications (IDs) to bid on his/her own auction items using the same client machine, for example, the same computer that is connected to the Internet-based action facility.

Shill Feedback

A feedback feature is an option allowing users to provide trustworthy rating or any comment regarding a particular user when they completed a transaction. In one example, comments are recorded in the feedback table 52 and/or feedback details table 53. Such comments may include whether the transaction went through smoothly, the seller/bidder/purchaser was good to deal with, or anything relating to the trustworthiness of the activities completed, are recorded here. Shill feedback is defied as fraudulent feedback by one person, either by a bidder, seller, or his associates, for himself, to fraudulently bolster his/her own trustworthiness. For instance, a user who is the seller may also pose as a bidder who has completed a transaction with this seller and now has rated him as a trustworthy person in order to encourage activity to his listing items.

Suspicious Transactions

Suspicious transactions may include but is not limited to shill bidding or shill feedback. Suspicious transactions may also include a fraudulent activity conducted with the transaction facility. Fraudulent activity likewise may include shill bidding or shill feedback.

Shill Cookie

A shill cookie of this method and apparatus invention is used for detecting, in turn, minimizing and deterring, shill bidding that occurs when the same client machine was used to both list and bid on an item This shill cookie invention is also used for detecting, minimizing and deterring shill feedback that occurs when the same client machine was used to both make a transaction and give a feedback comment regarding the transaction.

A cookie is a file that contains information (cookies) created by conventional Web sites (such as the Internet-based auction facility 10) that is stored on the user's machine, the client machine. A cookie is a one way for the Internet-based auction facility 10 to keep track of its users' patterns and preferences. The cookies may contain URLs (addresses) for the Internet-based auction facility 10. When the browser encounters the URLs again, it would send those specific cookies to the Web servers. In that event, it would save the user from typing the same information, such as user preferences, populated fields on the item listing form, etc., all over again when accessing that service for the second and subsequent time. For the cookies to work, the Web site typically needs the cooperation of the Web browser used by the client machine to store the cookies on the client machine in the cookie file.

One novel method of the instant invention is the application of a cookie as a mechanism to detect suspicious transactions or fraudulent activities. Using a cookie writing method, the shill cookie will record all activities that occurred on a particular client machine and when there is an interaction between the different accounts from the same computer, such interaction is recorded into a database (see below). This tracking mechanism is effective at detecting, minimizing, and deterring fraudulent transactions.

In one exemplary embodiment, when a new user (a user identity) with new user identification or user identifier (user-ID) performs one of the triggering events with the Internet-based auction facility 10, a cookie is placed in the client machine. In the event that a cookie for the Internet-based auction facility 10 already exists in the client machine, the cookie will add this new user's user-ID into the cookie. If at least two triggering events with two different user-IDs are both recorded into the same shill cookie, a potentially fraudulent activity is suspected.

Exemplary triggering events include: registering with the network-based transaction facility (e.g., user registration with the facility 10); communicating an offer to sell an offering (e.g., user listing an item for sale via the facility 10), communicating and offering to purchase the offering (e.g., user bidding on the offering via the facility 10), communicating a feedback regarding a transaction (e.g., user giving feedback comment on a transaction via the facility 10), updating a profile maintained by the facility 10 (e.g., user updating his personal profile), and/or any other bidding activities.

In one embodiment, the Internet-based auction facility 10 is currently recording user transaction preferences such as all of the information about any particular user. For example, selling preferences, preferred listing category, preferred buying category, preferred payment means, including what type of credit card and credit card numbers to accept or use, shipping information, and etc., are all recorded. The user would choose these options by checking off these options using a conventional user interface device, such as a keyboard or a mouse. By choosing these options, the user has instructed the Web browser to remember his/her user transaction preferences for dealing with the Internet-based auction facility 10. In that event, a cookie is created for this client machine.

Any subsequent dealing occurring from this client machine, for example, when a request is submitted for retrieval of information, this client machine will send the facility information such as the type of browser the client machine uses, the date of the request, as well as the information in the cookie file. Such sending is done automatically and freely each time an access to the Internet-based auction facility 10 is made. Therefore, for any subsequent dealing with the Internet-based auction facility 10, the Web browser will retrieve the information from the preference cookie and communicate it to this facility. This will save the user from having to choose the preferences again, unless the user wishes to modify the user transaction preferences.

FIG. 5A illustrates that the shill cookie 501 (will record at least the following information: a unique cookie identifier or identification (cookie ID) 502 and all user-IDs 503. The shill cookie 501 may be arranged in the shill cookie format 500 in which, all user-IDs who have used the same client machine for listing, bidding, or leaving feedback are recorded under user-IDs 503. All of the user-IDs 503 may take the form of sets of numbers delimited by ";" for example, 111222; 333444; 555666; and 777888. Each cookie name is recorded in the cookie ID 502, for example, a shill cookie may be named "cookie-shill," and the shill cookie from a particular client machine will have a unique cookie ID. The number of user-IDs to be stored in the user-IDs 504 is set at a predetermined number, for example,10. Each user ID may also be set at a predetermined character length, for example,8.

In a preferred embodiment, the shill cookie 501 is bundled together into a file containing multiple cookie files (cookie bundle). Cookie bundling is a common practice in this field wherein all of the separate cookies pertaining to different type of user transaction preferences are packed together into one file. The user must either accept all of the cookies as a bundle or none of the cookies will be placed in the machine. This cookie bundle may comprise other cookies for user transaction preferences that would be cumbersome for the user to creating anew each time the user accesses the Internet-based auction facility 10. The cookie bundle may include information relating to transactions with the Internet-based auction facility 10 as well as information relating to other request unrelated to auctioning.

In one method, a new cookie ID which indicates the shill cookie 501 is added to a list of other cookies. A cookie bundle's list may be as followings: "cookieuserID, cookie-Adult, cookie_signinpref, cookie_persistent_userID, cookie_SYI, cookie_watchtotal, cookie_skipaddphotopage, cookie_historyitem, cookie_history search, cookie_history_listing, and cookie_shill." Each of the cookies may contain information pertaining to a set of preferences chosen by the user for the user's convenience.

In the preferred embodiment, the cookie bundle is "non-session" or "permanent" which does not expire at the end of every session with the Internet-based auction facility 10. By default, most cookies are sessional and expire when the session is completed, like when the user closes the browser. Non-session cookie is configured by the Internet-based auction facility 10 to expire at a certain time.

It may be desirable to encrypt the shill cookie and the cookie bundle using any conventional encryption technology widely available. However, encryption is complicated and expensive.

In a preferred embodiment, the shill cookie and the cookie bundle are encoded. Encoding a cookie is formatting a cookie into a language that is not readily apparent to the user. This practice is well known in the field. The encoded cookie will be unreadable to a layman user without the formula to decode the cookie. Encoding the cookie would make it more difficult for even the savvy users to know that their users IDs are recorded to the cookie. For example, for a user with a user ID "John Doe," the cookie will display a number "123456," which is uniquely assigned to this user ID by the Internet-based auction facility 10. In this way, the user cannot alter a particular section of the cookie bundle without destroying the whole cookie bundle. For example, it will be difficult for the user to determine which code represents what preferences and which code represents the information that identifies the user. The user will not know what information to keep or delete such that his preference settings will not be destroyed.

In one embodiment, for each client machine, the non-session cookie bundle 511 containing shill cookie 501 may be recorded according to cookie bundle table 510. The table 510 may include a version column 512 for recording the version of the cookie bundle 511. The table 510 may also include a column 513 for the number of cookies, column 514 for all of the cookie IDs ever used, column 515 specifying the character length of each cookie and column 516 for recording the encoded information of each cookie. The cookie bundle's list mentioned above may be incorporated into the cookie ID column 514. It will be appreciated that other cookie information may also populate the cookie bundle table 510.

Suspicious Transactions Table

A potentially fraudulent activity table is defined as a table that is stored within the database 23 of the Internet-based auction facility 10 that will record and store all the occurrences of suspicious transactions such as shill bidding and shill feedback. The potentially fraudulent activity table may store any suspicious transactions occurring over the facility 10. Tis table may be viewed as a shill table that record all the frequency of shill bidding or shill feedback after the occurrence of some triggering events. The following sections illustrate some triggering event examples.

Figure 6A:
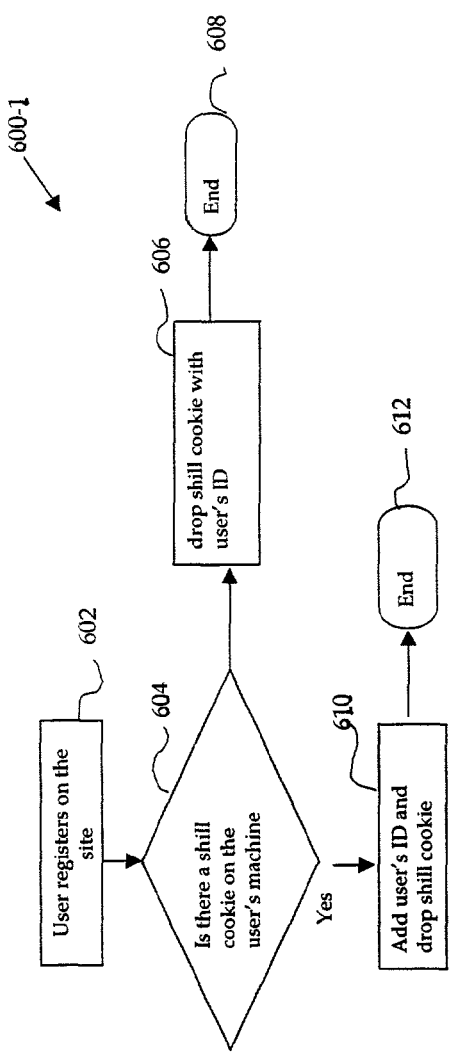
FIGS. 6A-D illustrate exemplary flow diagrams of embodiments for a method of detecting suspicious transactions occurring over a network-based transaction facility.

FIG. 6A illustrates registration 600-1 which triggers the placing of a shill cookie into client machine. A user ID is required for the user to access the Internet-based auction facility 10. Step 602 shows the user registers with the facility 10 (the site) from a client computer. Step 604 shows that the facility 10 searches to see if a shill cookie is already on the client machine. If it does not already exist, step 606 will place a shill cookie in the client computer. Step 606 also shows that after a shill cookie is dropped in the client machine, the user ID will be recorded into that shill cookie. Step 610 shows that if the shill cookie already exists but that it does not already contain the user ID, that user ID will be added to the shill cookie. Once the shill cookie is dropped and the user ID is recorded, step 608 or step 612 completes the registration 600-1.

Figure 6B:
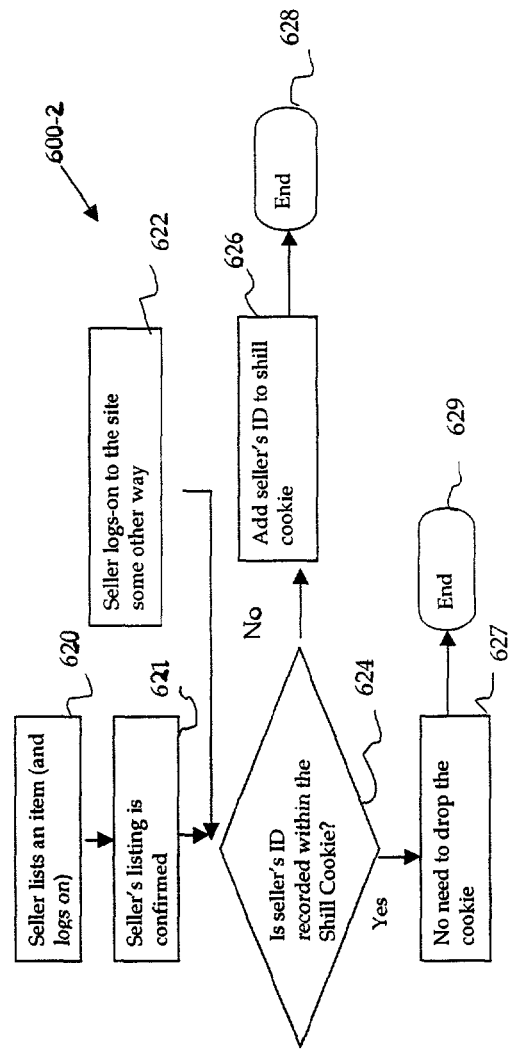

FIG. 6B illustrates listing 600-2 which triggers the placing of a shill cookie in the client computer. It may be referred to as "Sell Your Items" (SYI) at some Internet-based auction facility. Step 620 shows the user logs on to the Internet-based auction facility 10 (the site) and lists an item for sale from a client computer. At step 621, the facility 10 confirms the listing. Step 622 shows that the user may log on to the site via some other way, for example, from a different location and/or different client machine. In step 624, the network-based auction facility 10 will search to see if a shill cookie is in the client machine and if not, places the shill cookie in the client machine. The client machine in this example is the one that the user uses to log on. Then, step 626 will search to see if the user's ID is already recorded in the shill cookie, and if not, add the user's ID into the shill cookie. Step 627 shows that if the shill cookie already exists and the user's ID is also already recorded in the shill cookie, there is no need to drop another cookie. And, step 628 or step 629 completes the listing 600-2.

Figure 6C:
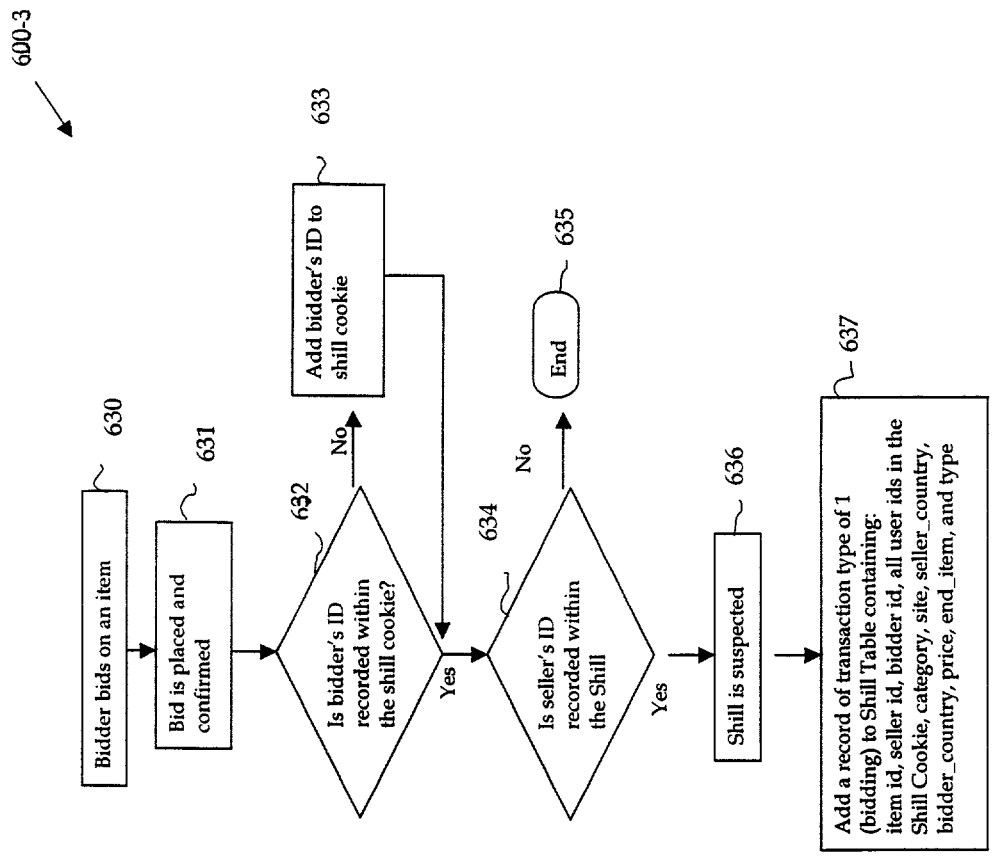

FIG. 6C illustrates bidding 600-3 which triggers the placing of a shill cookie as well as detecting shill bidding in the client computer. Step 630 shows the user logs on to the Internet-based auction facility 10 (the site) and bids on a listed item from the client computer. At step 631, the facility 10 places and confirms the bid. In step 632, the network-based auction facility 10 will search to see if a shill cookie is in the client machine and if not, places the shill cookie in the client machine. Then, step 633 will search to see if the user's ID is already recorded in the shill cookie, and if not, add the user's ID into the shill cookie. Step 634 is an inspection step. In step 634, the Internet-based auction facility 10 will examine the shill cookie from the client machine to see if the ID of the user who listed the item for sale is the same as the ID of the user who placed a bid on the item. If no matching is detected, step 635 completes the bidding 600-3. If there is a match, step 636 will indicate to the Internet-based auction facility 10 that shill bidding is suspected. Step 637 shows an exemplary step that the Internet-based auction facility 10 will take when a shill bidding is suspected. Step 637 will add a record of the shill bidding activity into a table containing information such as item id, seller id, bidder id, all user ids in the shill cookie, category, site id, seller country, bidder country, price, end item, and type. (See below).

Figure 6D:
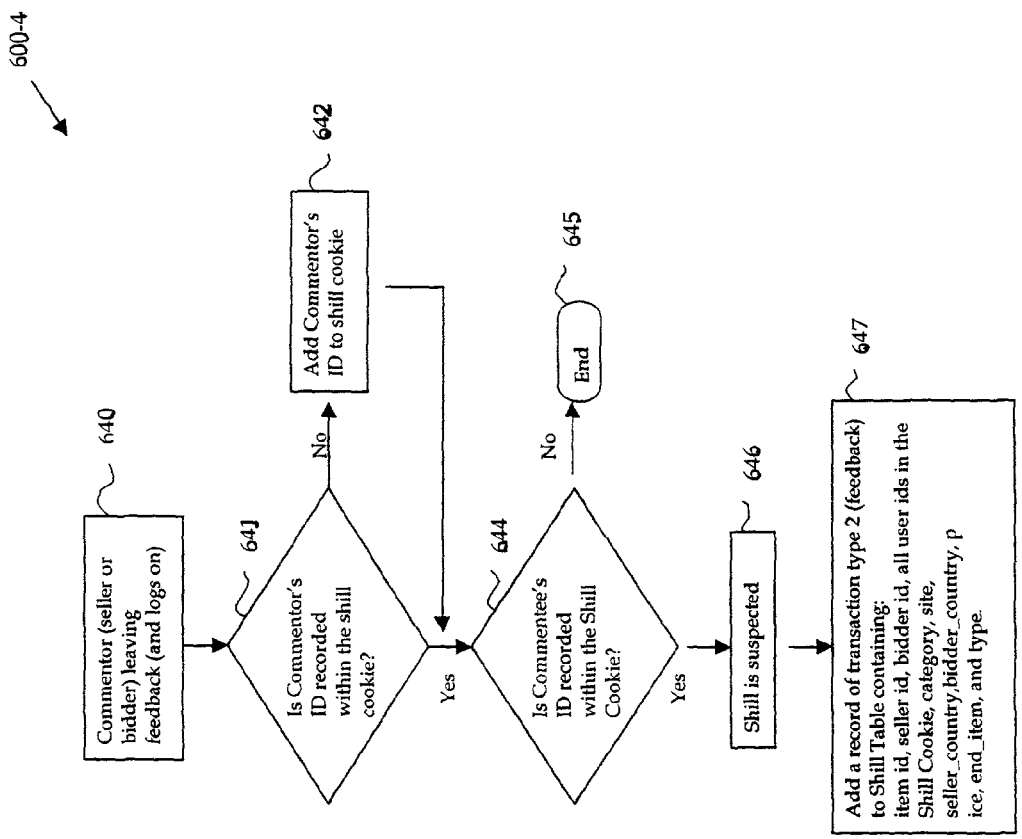

FIG. 6D illustrates feedback 600-4 which triggers the placing of a shill cookie as well as detecting shill feedback in the client machine. Step 640 shows a commentor, the user, logs on to the Internet-based auction facility 10 (the site) and leaves a feedback comment regarding a particular transaction on a listed item from the client computer. At step 641, the facility 10 will check his user ID. For instance, the facility 10 will search to see if a shill cookie is in the client computer and if not, places the shill cookie in the client computer. Then, step 642 will search to see if the user's ID is already recorded in the shill cookie, and if not, add the user's ID into the shill cookie. Step 644 is an inspection step. In step 644, the Internet-based auction facility 10 will examine the shill cookie from the client machine to see if the ID of the user who leaves the feedback is the same as the ID of the user for whom the feedback pertains to (the commentee). If no matching is detected, step 645 completes the feedback 600-4. If there is a match, step 646 will indicate to the Internet-based auction facility 10 that a shill feedback is suspected. Step 647 shows an exemplary step that the Internet-based auction facility 10 will take when a shill feedback is suspected. Step 647 will add a record of the shill feedback activity into a table containing information such as item id, seller id, bidder id, all user ids in the shill cookie, category, site id, seller country, bidder country, price, end item, and type. (See below).

In one embodiment, the facility 10 may cause a first identifier (e.g., a userID) that is associated with a first user identity (e.g., a seller or a bidder) to be stored on the machine (e.g., a client computer). This action is responsive to the first user identifier making a first event (e.g., his first transaction) with the facility 10 using the user-ID. In this example, the computer is coupled to the facility 10, for example, via a network connection.

The facility 10 will detect a potentially fraudulent activity when a second event (e.g., a second transaction) is made with the facility 10 using the same client computer. When the second event is made with a second user identifier (e.g., a new userID), the facility 10 may also cause the new user ID to be stored on the machine. When the facility 10 detects that there is a lack of correspondence between the first user identifier and the second user identifier, the potentially fraudulent activity is suspected. For instance, when both the first user identifier and the second user identifier are stored on the same client machine and they are distinct from one another, a potentially fraudulent activity is detected because of the lack of correspondence. In one embodiment, the facility 10 will cause the lack of correspondence between the first user identifier and the second user identifier to be detected at the machine. In that event, the facility 10 may send a program to the machine requesting a comparison of the first user identifier and the second user identifier and if there is a difference between the two identifiers the information is alerted to the facility 10. In another embodiment, both the first and the second user identifiers are sent by the machine to the facility 10 and the facility 10 will perform the detection of the lack of correspondence between these two user identifiers or any user identifiers for that matter. The user identifiers may be sent to the facility 10 using any conventional method of automatic exchanging of information between the machine and the facility 10 as discussed above (e.g., cookie mechanism).

When the potentially fraudulent activity is detected, the facility 10 may cause the system to prohibit a completion of any of the transactions. Alternatively, the facility 10 may allow the transaction to be completed and delay any course of action that the facility 10 may take. In this manner, the users committing the potentially fraudulent activities are unaware of the detection of their activities by the facility 10 until some course of actions is taken.

The first event and the second event may be any one of the triggering events described above. These events may also be any one of the following: registering with the network-based transaction facility, communicating an offer to sell an offering via the network-based transaction facility, communicating and offering to purchase the offering via the network-based transaction facility, communicating a feedback regarding a transaction, and updating a profile maintained by the network-based transaction facility.

It will be appreciated that the facility 10 will continue its process of detecting potentially fraudulent activities each time a new user identifier is used to make a new event using the same machine that the first user identifier used.

In yet another embodiment, the matching of the user-IDs occurring in FIGS. 6A-6D may be done by matching the user transaction preferences of the users as opposed to matching the user-IDs discussed above. For example, the Internet-based auction facility 10 may match the shipping addresses, payment method, credit card numbers, bidding history, and the like that are common between any two users.

Figure 7A:
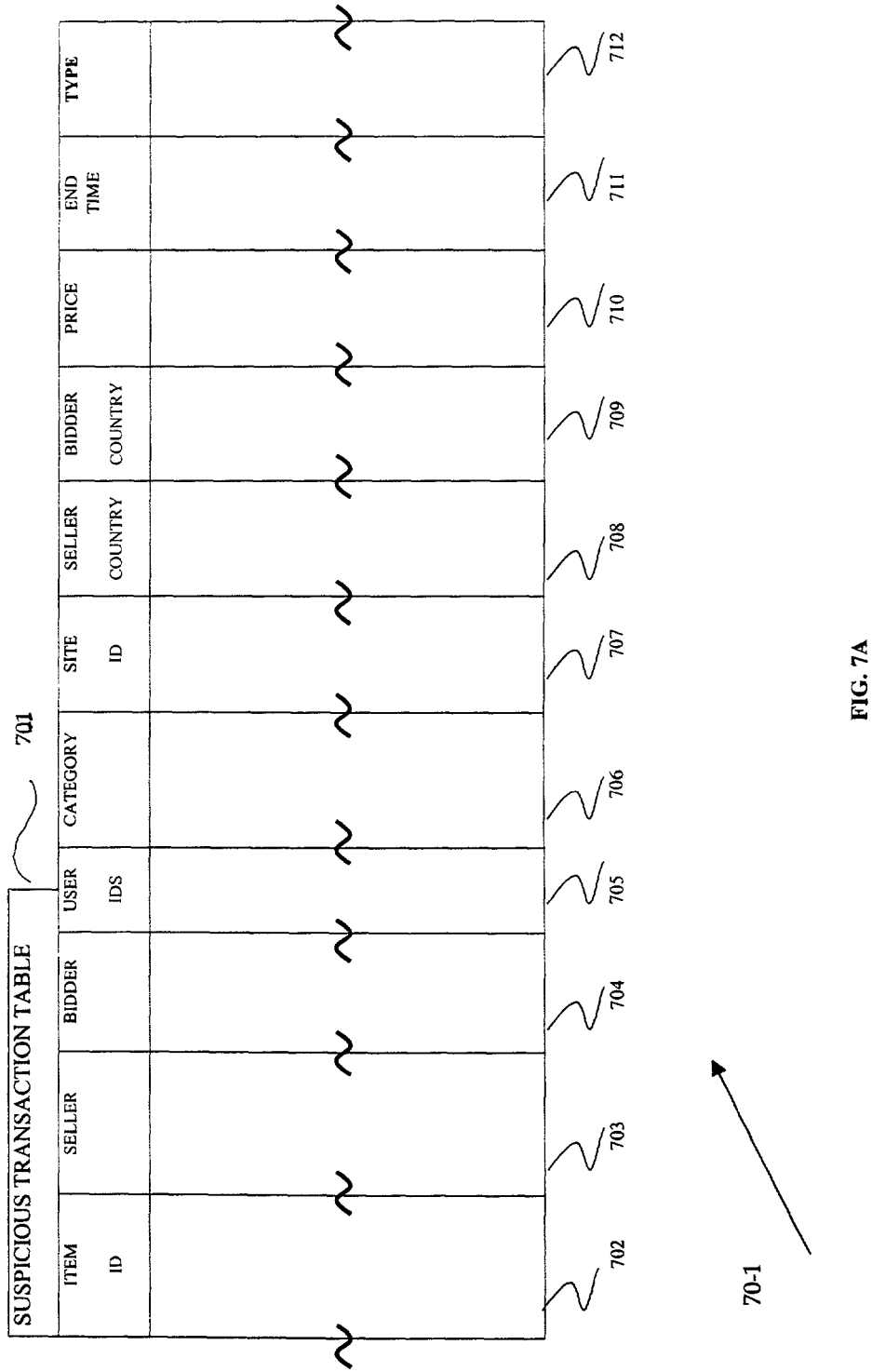
FIG. 7A illustrates an exemplary suspicious transactions table keeping record of suspicious transactions.
Figure 7B:
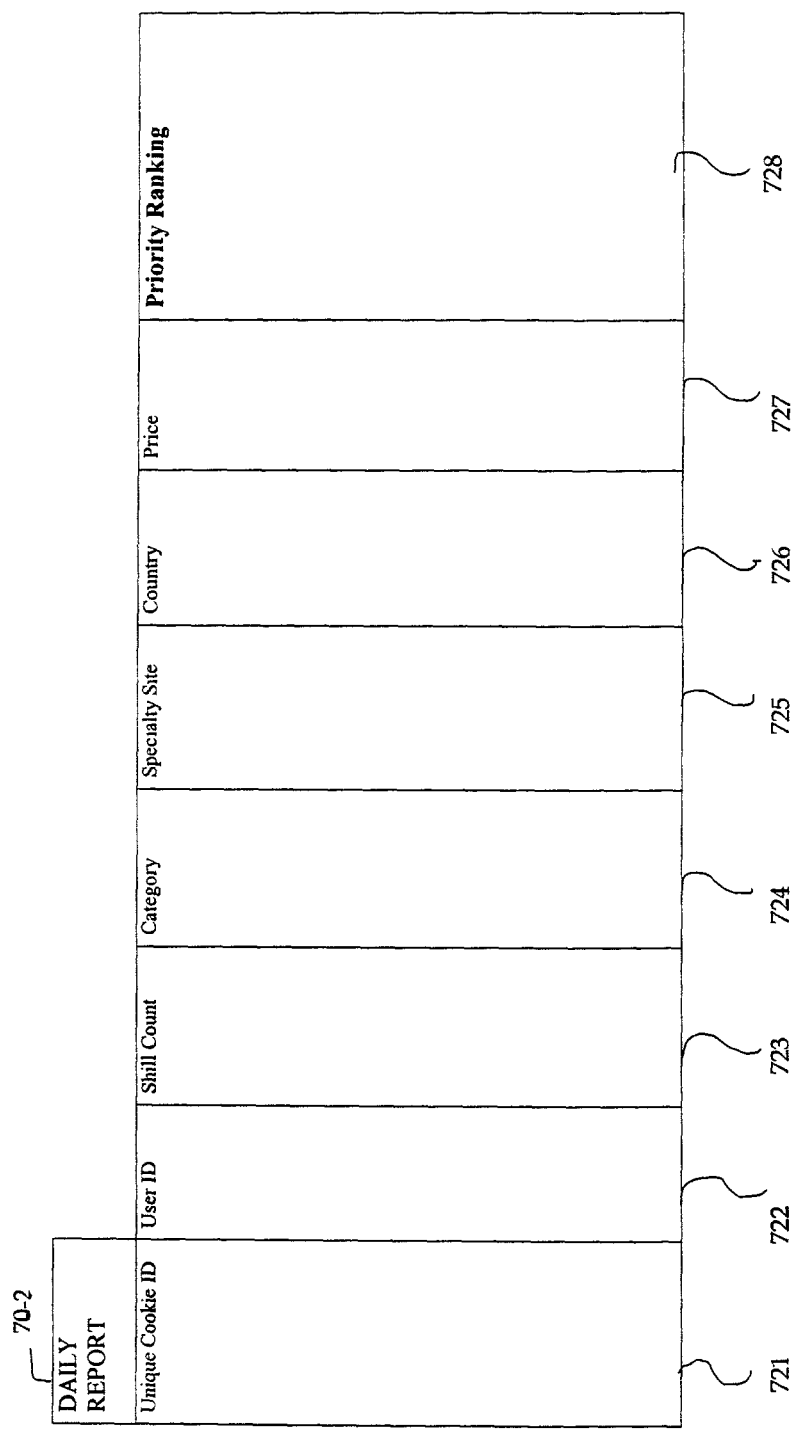
FIG. 7B illustrates an exemplary report provided to an Investigation Team.

All of the suspicious transactions are or the potentially fraudulent activities recorded and sent to a database, such as database 23. These transactions are tabulated into the suspicious transactions table 70-1. FIG. 7 illustrates an exemplary embodiment of the suspicious transactions table 70-1, table 701. Table 701 may be populated with a column 702, for recording the ID of the items that had shill bidding or shill feedback; column 703, for recording the seller's user ID; column 704, for recording the bidder's user ID; column 705, for recording all the user identifiers or the user IDs that have been used with the particular client machine; column 706, for recording the transaction category that had shill bidding or shill feedback; and column 712, for recording the type of suspicious transaction, such as shill bidding or shill feedback. Table 701 may also be populated with other columns such as 708, 709, 710, and 711 for recording the country information of the seller, the country information of the bidder, the price of the item, the starting price and the bidding price of the item, and the date of the sales, respectively.

It will also be appreciated that other information may also populate the suspicious transaction table 701 without the lost of generality.

In one embodiment, a daily report 70-2 is generated at the end of each day or at any other predetermined time. (See FIG. 7B). The daily report 70-2 may be updated as frequently as necessary, for instance, on a daily basis, a weekly basis, or any other suitable periodic basis. The daily report 70-2 may be recorded in the database 23. This report 70-2 is provided to an Investigation Team who will confirm whether the suspicious transactions were indeed shill bidding or shill feedback or other fraudulent activities occurring on the Internet-based auction facility 10. The report 70-2 may be provided to the team through an electronic mail system, traditional mail system, paper document, or by any other convenient methods.

In one example, the report 70-2 comprises a field 721 for cookie IDs. This field 721 records all of the unique identification numbers of all cookies, which corresponds to certain client machines that record the suspicious transactions. The report 70-2 also comprises a field 722 for all of the user-IDs that are stored within the shill cookie. The field 722 will help give the Investigation Team insights, for example, that users X, Y, and Z share the same machine and are closely linked. This information provides additional utility, such as the ability to enforce the account disclosure initiative. Such a tool provides the Internet-based auction facility 10 with the visibility to all accounts owned by members. The report 70-2 also comprises a field 723 which records the frequency (shill count) for each of the client machine.

In another embodiment, the report 70-2 may also include field 724,725, 726, and 727 for optional information such as the category that had suspicious transactions, the specialty site that had suspicious transactions, the country where the suspicious transactions occurred and the price range within which the suspicious transactions occurred.

In a preferred embodiment, the report 70-2 have all of the information sorted by user IDs and by shill count in a descending or ascending order. The user IDs may also be listed first to alert the Investigation Team to the repeat offenders for appropriate actions.

In yet another preferred embodiment, the report 70-2 may include a ranking indication such as to alert the Investigation Team to the client machine with the highest frequency of occurrences of suspicious transactions. For instance, the report 70-2 may be sorted in the order of high frequency occurrence to low frequency occurrence. The ranking indication may be included in priority ranking column 728. A system such as high priority, medium priority, and low priority may be established to indicate to the Investigation Team which group of client machines the team should investigate first. In one example, the high priority group may include those cookie IDs with shill counts above 200; the medium priority group may include those cookie IDs with shill counts between 51-200; and the low priority group may include those cookie IDs with shill counts between 1-50.

In one embodiment, the management team at the Internet-based auction facility 10 is endorsed with the ability to override the report for a particular client machine. Alternatively, the management team is endorsed with the ability to perform selective auditing of a certain client machine. This feature is particularly helpful for the unusual situations where the Internet-based auction facility 10 already knows that the same client machine will be used to make many different transactions. An auction house is one of such example.

In summary, it will be appreciated that the above described interfaces, and underlying technologies, provide a convenient vehicle for verifying the identity of a participant in a transaction facility using a seamlessly integrated, real-time process and for making a verification result readily available to other participants.

Computer Architecture

Figure 8:
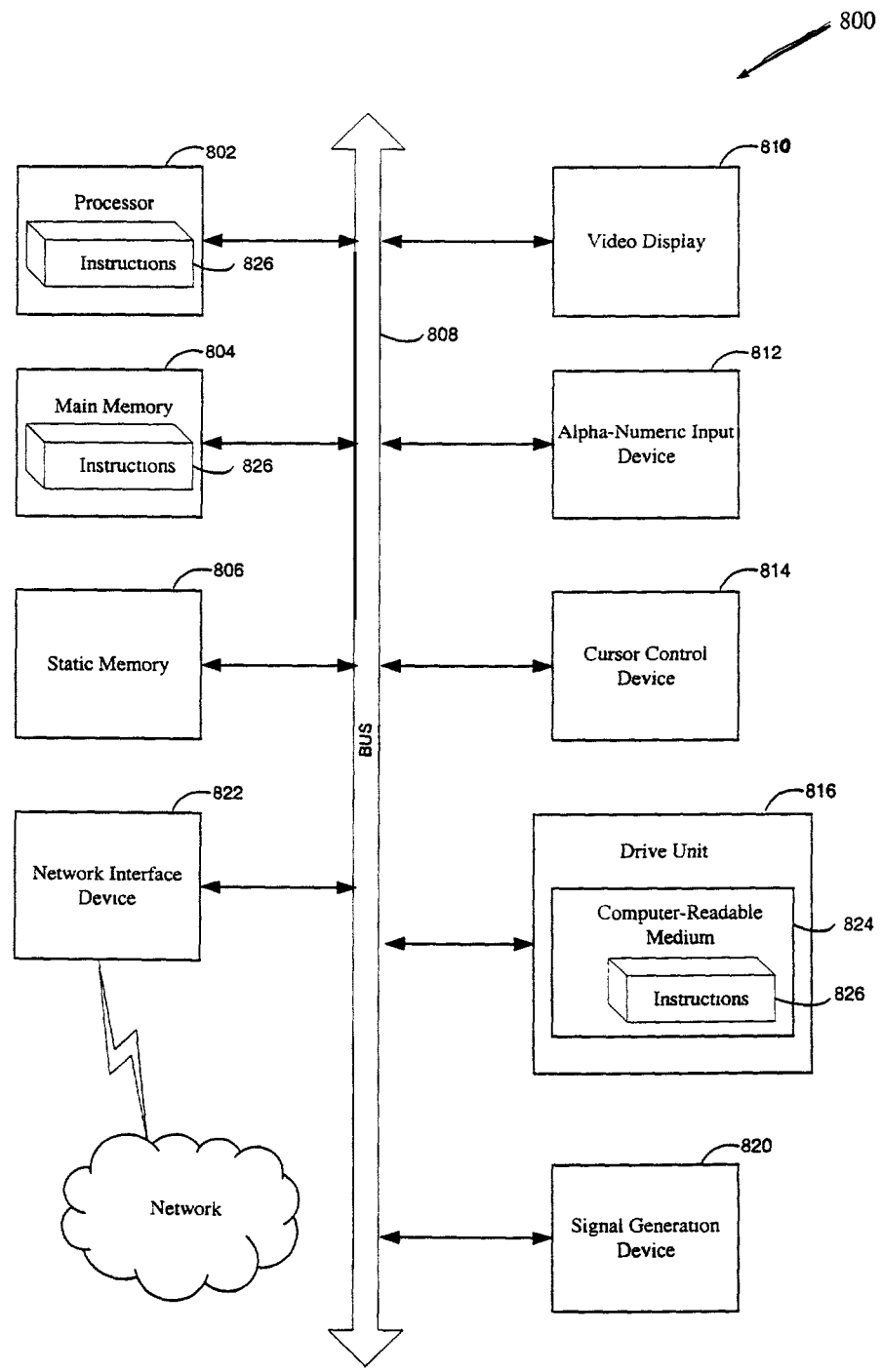
FIG. 8 illustrates a block diagram of an exemplary embodiment of a computer system.

FIG. 8 shows a diagrammatic representation of machine in the exemplary form of a computer system 800 within which a set of instructions, for causing the machine to perform any one of the methodologies discussed above, may be executed. In the alternative embodiment, the machine may comprise a network router, a network switch, a network bridge, Personal Digital Assistant (PDA), a cellular telephone, a web appliance or any machine capable of executing a sequence of instructions that specify actions to be taken by the machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for detecting suspicious transactions occurring over a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A method of detecting a fraudulent activity at a network-based transaction facility, the method comprising:
    generating a first identifier associated with a first user identity, the first identifier to be stored in a shill cookie on a client machine of the first user, the first identifier being generated responsive to at least a first of a plurality of triggering events with respect to the network-based transaction facility, the network-based transaction facility being coupled to the client machine via a network;
    generating a second identifier associated with a second user identity, the second user identity to be stored in the shill cookie on the client machine, the second identifier being generated responsive to at least a second of the plurality of triggering events with respect to the network-based transaction facility;
    receiving information stored on the shill cookie at the network-based transaction facility; and
    detecting a potentially fraudulent activity by detecting a lack of correspondence between the first identifier and the second identifier.

2. The method of claim 1, further comprising recording the potentially fraudulent activity at the network-based transaction facility responsive to a detection of the lack of correspondence between the first identifier and the second identifier.

3. The method of claim I, wherein the at least one of the plurality of triggering events is a sales transaction event, the method further comprising prohibiting a completion of the sales transaction event responsive to the detection of the lack of correspondence between the first identifier and the second identifier.

4. The method of claim I, wherein the at least one of the plurality of triggering events is a sates transaction event, the sales transaction event including at least one of registering with the network-based transaction facility, communicating an offer to sell an offering via the network-based transaction facility, communicating and offering to purchase the offering via the network-based transaction facility, communicating a feedback regarding a transaction, or updating a profile maintained by the network-based transaction facility.

5. The method of claim 1, further comprising:
    causing a cookie identifier to be stored with the shill cookie;
    causing the shill cookie to be coupled to a cookie bundle that records a plurality of transaction preferences for the first user identity and the second user identity on the client machine;
    causing the shill cookie bundle to be sent from the client machine to the network-based transaction facility when the second user identify makes the the at least the second of the plurality of triggering events with the network-based transaction facility using the client machine;
    causing the cookie bundle to be inspected for the potentially fraudulent activity; and
    causing the potentially fraudulent activity to be recorded into a database.

6. The method of claim 5, wherein an inspection of the shill cookie comprises a source fbr the detection of the lack of correspondence between the first identifier and the second identifier.

7. The method of claim 1, further comprising causing the shill cookie to be a non-session cookie residing on the client machine for a predetermined amount of time.

8. The method of claim 1, further comprising causing the shill cookie to be appended every time a new user identifier is used to establish a third of the plurality of triggering events with the network-based transaction facility using the client machine wherein there is a lack of correspondence between the new user identifier and the first user identifier.

9. The method of claim 1, wherein the network-based transaction facility comprises an Internet-based auction facility.

10. The method of claim 1, further comprising causing the shill cookie to record and to store a predetermined number of user identifiers.

11. The method of claim 1, further comprising causing the shill cookie to be encoded.

12. The method of claim 1, further comprising causing the shill cookie to be encrypted.

13. The method of claim I. further comprising:
    generating a potential fraudulent activities table having a fraudulent activity field, a cookie identifier field, a user identifier field, and a frequency field;
    recording each of a plurality of potentially fraudulent activities and corresponding information into the potential fraudulent activities table;
    updating the potential fraudulent activities table at least on a periodic basis; and
    providing an updated report of the potential fraudulent activities table to an investigation team.

14. The method of claim 13, further comprising configuring the potential fraudulent activities table to include a transaction product category field, a transaction country field, a transaction price range field, and a transaction activity field.

15. The method of claim 13, further comprising providing the network-based transaction facility with a capability of overriding the updated report to the investigation team.

16. The method of claim 1, further comprising providing a priority ranking system having a low priority for a low potential fraudulent activity frequency, a medium priority for a medium potential fraudulent activity frequency, and a high priority for a high potential fraudulent activity frequency.

17. The method of claim 1, wherein the potentially fraudulent activity includes at least one of shill biddings and shill feedbacks.

18. The method of claim 1, further comprising causing the detection of the potentially fraudulent activity responsive to a matching of a plurality of user transaction preferences from a plurality of different user identifies.

19. The method of claim 18, wherein the plurality of user transaction preferences include credit card numbers, bidding histories, payment methods, and shipping addresses.

20. A non-transitory computer readable storage medium comprising instructions, which when executed on a processor, cause the processor to perform a method of detecting suspicious transactions made over a network-based transaction facility using a client machine, the method comprising:
generating a first identifier associated with a first user identity, the first identifier to be stored in a shill cookie on a client machine of the first user, the first identifier being generated responsive to at least a first of a plurality of triggering events with respect to the network-based transaction facility, the network-based transaction facility being coupled to the client machine via a network;
generating a second identifier associated with a second user identity, the second user identity to be stored in the shill cookie on the client machine, the second identifier being generated responsive to at least a second of the plurality of triggering events with respect to the network-based transaction facility;
transmitting information stored on the shill cookie to the network-based transaction facility; and
detecting a potentially fraudulent activity by detecting a lack of correspondence between the first identifier and the second identifier.

21. A system to detect a fraudulent activity at a e network-based transaction facility, the system comprising:
an identifier processor to generate and forward a shill cookie over a network to be stored on a client machine responsive to at least a first of a plurality of triggering events being produced at the client machine after the client machine accesses the network-based transaction facility via the network , the shill cookie to contain information related to a first identifier associated with a first user identity, the identifier processor further to generate a second identifier associated with a second user identity, the second user identity to be stored in the shill cookie on the client machine, the second identifier being generated responsive to at least a second of the plurality of triggering events with respect to the network-based transaction facility; and
a detection processor to detect a potentially fraudulent activity by detecting a lack of correspondence between the first identifier and the second identifier.

22. The system of claim 21, wherein the detection processor is to receive from the client machine both the first identifier and the second identifier at the network-based transaction facility.

23. The system of claim 21, further comprising a recording processor to record the potentially fraudulent activity at the network-based transaction facility responsive to the detection of the lack of correspondence between the first identifier and the second identifier.

24. The system of claim 21, further comprising a cookie recording processor to record the first identifier and the second identifier to be recorded within the shill cookie.

25. The system of claim 21, further comprising:
a bundling processor to cause the shill cookie to be coupled to a cookie bundle that records a plurality of transaction preferences for the first user identity and the second user identity on the client machine;
a sending processor to cause the shill cookie bundle to be sent from the client machine to the network-based transaction facility when the second user identify makes the at least the second of the plurality of triggering events with the network-based transaction facility using the client machine;
an appending processor to cause the shill cookie to he appended with the second identifier responsive to the detection of the lack of correspondence between the first identifier and the second identifier at one of the client machine and the network-based transaction facility;
an inspection processor to cause the cookie bundle to be inspected for the potentially fraudulent activity; and
a recording processor to cause the potentially fraudulent activity to be recorded into a database.

26. The system of claim 21, further comprising:
a tabulating processor to generate a potential fraudulent activities table having a fraudulent activity field, a cookie identifier field, a user identifier field, and a frequency field;
a recording processor to record each of a plurality of potentially fraudulent activities and corresponding information into the potential fraudulent activities table; and
an updating processor to update the potential fraudulent activities table at least on a periodic basis and to provide an updated report of the potential fraudulent activities table to an investigation team.

* * * * *

UNITED STATES PATENT AND TRADEMARK OFFICE
CERTIFICATE OF CORRECTION

| | | |
|---|---|---|
| PATENT NO. | : 8,630,938 B2 | Page 1 of 1 |
| APPLICATION NO. | : 09/905046 | |
| DATED | : January 14, 2014 | |
| INVENTOR(S) | : Cheng et al. | |

It is certified that error appears in the above-identified patent and that said Letters Patent is hereby corrected as shown below:

In the Claims:

In column 12, line 1, in Claim 3, delete "I" and insert --1--, therefor

In column 12, line 7, in Claim 4, delete "I" and insert --1--, therefor

In column 12, line 8, in Claim 4, delete "sates" and insert --sales--, therefor

In column 12, line 25, in Claim 5, after "makes", delete "the", therefor

In column 12, line 33, in Claim 6, delete "fbr" and insert --for--, therefor

In column 12, line 55, in Claim 13, delete "I." and insert --1,--, therefor

In column 13, line 44, in Claim 21, after "a", delete "e", therefor

In column 13, line 51, in Claim 21, delete "network ," and insert --network,--, therefor In column 14, line 32, in Claim 25, delete "he" and insert --be--, therefor Signed and Sealed this
Third Day of June, 2014

Michelle K. Lee
*Deputy Director of the United States Patent and Trademark Office*